United States Patent [19]

Holmgren et al.

[11] Patent Number: 5,676,437
[45] Date of Patent: Oct. 14, 1997

[54] STUDLESS TRACTION ASSEMBLY

[76] Inventors: Michael D. Holmgren; Christopher J. Angelo, both of P.O. Box 88132, Carol Stream, Ill. 60188

[21] Appl. No.: 699,606

[22] Filed: Aug. 19, 1996

[51] Int. Cl.$^6$ ................................................. B62D 55/27
[52] U.S. Cl. ........................................ 305/180; 305/165
[58] Field of Search ................................ 305/54, 35 R, 305/35 EB, 38, 165, 167, 168, 180, 187, 191; 36/114, 124, 126, 127, 128, 129, 134

[56] References Cited

U.S. PATENT DOCUMENTS

| | | |
|---|---|---|
| 3,572,851 | 3/1971 | Schuler . |
| 3,838,894 | 10/1974 | Reedy . |
| 3,883,190 | 5/1975 | Kilbane, Jr. . |
| 4,758,055 | 7/1988 | Anderson . |
| 5,188,441 | 2/1993 | Rubel . |
| 5,273,351 | 12/1993 | Rubel . |
| 5,284,386 | 2/1994 | Rubel . |
| 5,299,860 | 4/1994 | Anderson . |
| 5,401,088 | 3/1995 | Rubel . |

OTHER PUBLICATIONS

Roetin Traction Control System 1993 Catalog.
Woody's Traction and Control Products 1994 Catalog.
Saber Snowmobile Traction Products 1995 Catalog.

*Primary Examiner*—Russell D. Stormer
*Attorney, Agent, or Firm*—Meroni & Meroni

[57] ABSTRACT

This invention concerns the improvements in a studless traction assembly for a vehicle track, including a stud, the vehicle track having an inner surface, an outer surface for contacting a support surface and an aperture extending from the inner surface to the outer surface. The improvements comprise a hollowed-out T-shaped nut. The hollowed-out T-shaped nut has a first end and a second end. An inner plate is located at the first end of the hollowed-out T-shaped nut and the inner plate has an undersurface for contacting the inner surface of the vehicle track. The improvement further comprises an outer washer. The outer washer has a center portion operably engageable with the second end of the hollowed-out T-shaped nut and the outer washer and the inner plate are adapted to contact a portion of the vehicle track therebetween upon operable engagement of the hollowed-out T-shaped nut and the outer washer with each other and the vehicle track. Finally, the hollowed-out T-shaped nut is retainingly engageable with the stud in a removable connected relationship when the hollowed-out T-shaped nut and the outer washer are operably engaged with each other and the vehicle track.

37 Claims, 3 Drawing Sheets

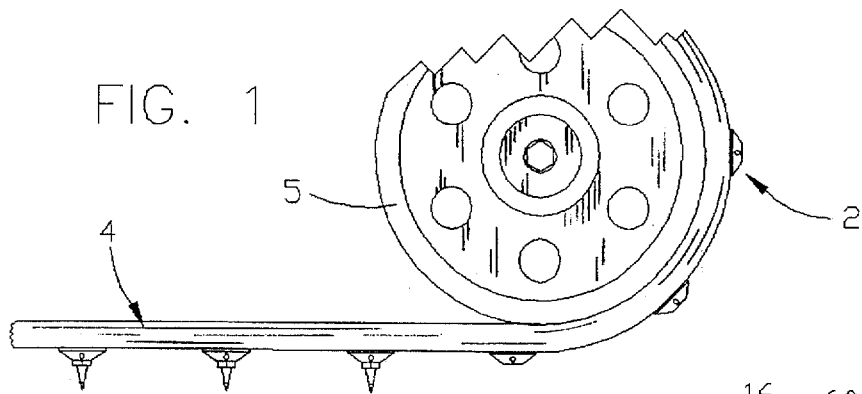
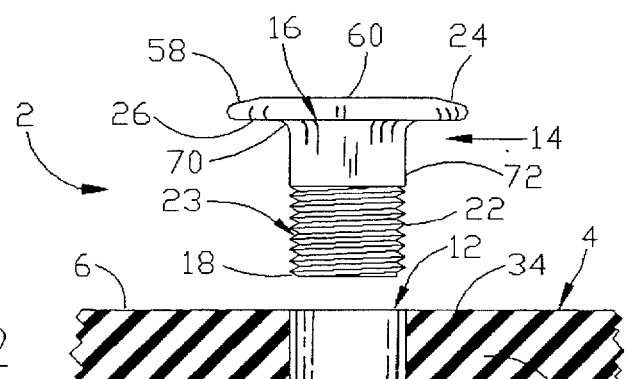
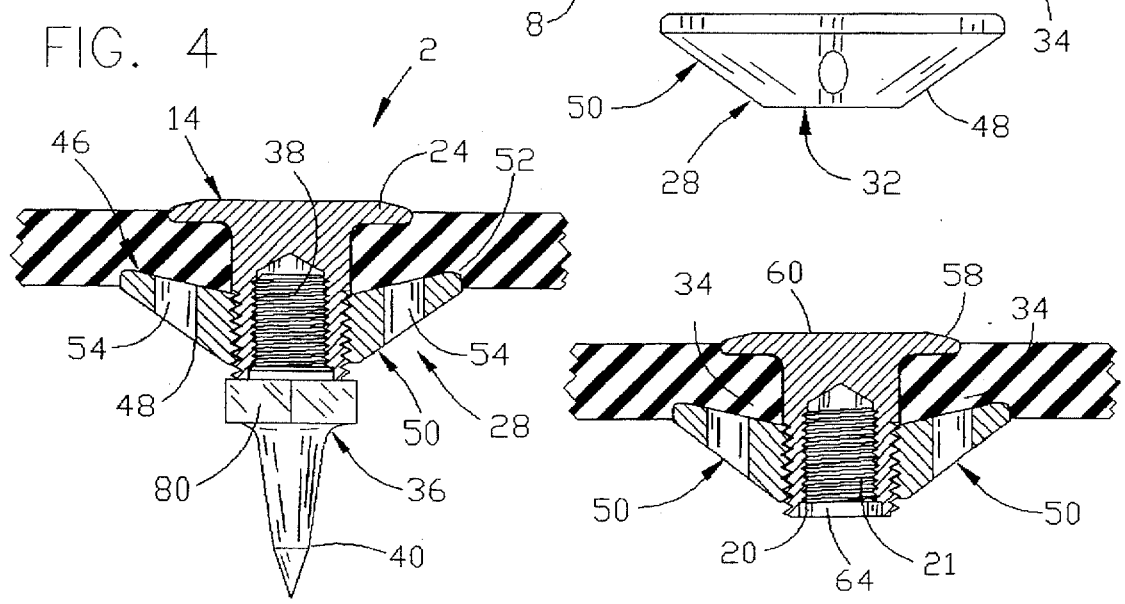

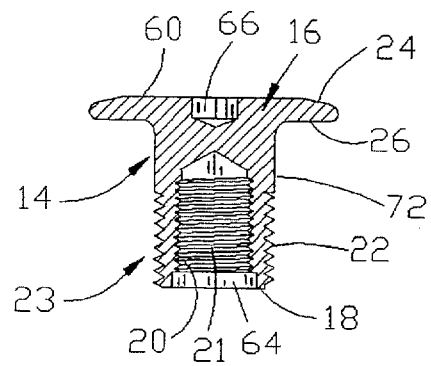
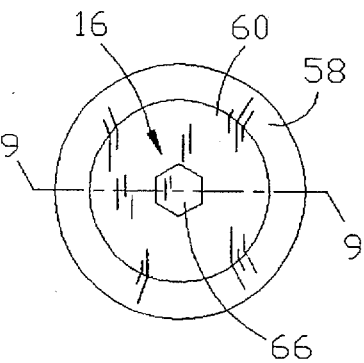
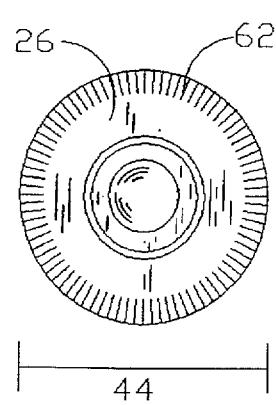
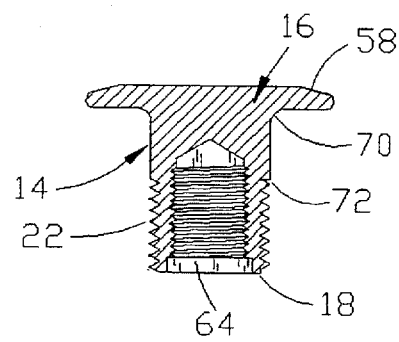
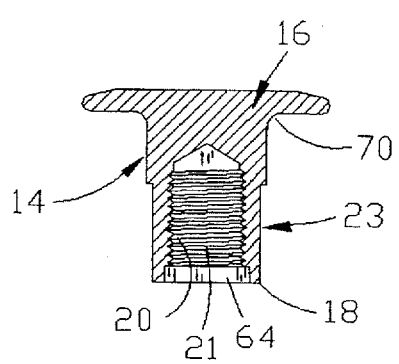
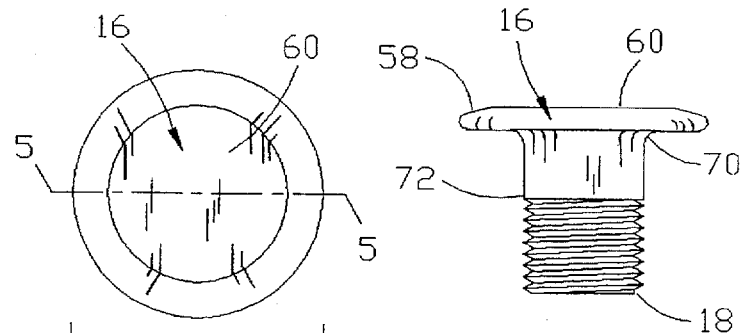
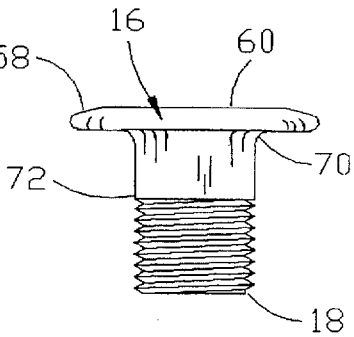

STUDLESS TRACTION ASSEMBLY

BACKGROUND OF THE INVENTION

1. Field of the Invention

The present invention relates generally to a traction assembly for a vehicle track. More specifically, it relates to a studless semi-permanent two piece traction assembly for use in a flexible endless vehicle track, such as a snowmobile.

2. Description of the Prior Art

Supplemental traction assemblies for vehicles driven by an endless flexible belt, and in particular snowmobile vehicles, have been in existence for some time. For example U.S. Pat. Nos. 3,572,851 and 3,883,190 disclose traction cleat or stud assemblies that utilize the often existing elongated channels already in the drive belt to provide enhanced traction assemblies to compensate for changing surface conditions from fluffy snow to packed snow, to ice, to mud and grass just to name a few. However, it has only been within the last about twenty years that the vehicle track driven belt industry has seen the advent of individual studded traction assemblies that are installed one at a time in a belt and can be configured as a user desires.

The first such individual studded traction assembly that is still widely used in the industry today is that of the type disclosed in U.S. Pat. No. 3,838,894 issued in the name of the inventor Donald G. Reedy. The Reedy patent discloses a four part studded traction assembly. Such an assembly comprises a T-nut shaped base held on an inside surface of the vehicle track, a washer disposed on an outside surface of the vehicle track, a threaded stud that extends through the washer and screws into the T-nut shaped base, holding the whole studded traction assembly together in the vehicle track. Finally, an interchangeable sharp elongated wear member is insertable into the threaded stud to provided the traction assembly with an ice-shearing ability when the vehicle is in motion.

Over time certain disadvantages were detected in the Reedy patented type studded traction assembly, namely its numerous parts, its cumbersome installation each time a user desired to change studs to adjust to different "ground" surface conditions, and its tendency to cause track deterioration. Several patented studded traction assemblies have followed the Reedy patented device all in an effort to overcome the disadvantages of the Reedy patented device.

In particular U.S. Pat. Nos. 4,758,055 and 5,299,860 disclose two part studded traction assemblies that reduce the overall number of parts required and thus are easier to install than the Reedy patented device and that also address the problem of track deterioration, each in their own way. However, these two patented devices still suffer from the big disadvantage of being cumbersome to install the first time, as well as, each time a user desires to change studs to adjust to different support or "ground" surface conditions.

Stated further, each time the studded assemblies disclosed in U.S. Pat. Nos. 4,758,055 and 5,299,860 are installed in the vehicle track, a user must have access to the back side of the vehicle track, placing their hands and tools into the suspension of the vehicle to individually prevent each and every threaded stud from turning upon engagement with the cooperating threaded fastener or nut which holds the threaded stud in place in the track. A further disadvantage to this type of an assembly is that if one or more stud is sheared off during operation of the track driven vehicle, again, in order to change the stud access must be gained to the back side of the track and each individual stud must be changed as desired.

Finally, still a further disadvantage of the U.S. Pat. Nos. 4,758,055 and 5,299,860 patented devices is that although they embody fewer overall parts, the total material composition is of greater weight. In order to obtain a stud of sufficient tensile strength to endure the rigor of ice-shearing, the stud must be constructed of a hardened steel material. Such a material is necessary for ice-shearing purposes, however, it is not necessary to maintain an assembled position in the track once installed therein. The result is a studded traction assembly being of an overall more weighty material composition than is necessary simply to maintain the studded traction assembly in an assembled position in the vehicle track.

Consequently, a vehicle track having several such more weighty studded traction assemblies has a compounded overall greater weight than would be necessary and which thus results in the vehicle having to expend more energy to attain the same track drive speed as that of a less weighty track. Moreover, since the track is in motion, the energy requirement of the vehicle is even more encumbered since physics dictates that additional energy is required to sustain the velocity of a moving mass object (each studded traction assembly in the vehicle track and the track itself relative to the track driven vehicle when in motion) over that required to sustain the same velocity of a non-moving mass (the track driven vehicle relative to itself in motion).

Three other patents that disclose basically the same type of yet a different studded traction assembly are U.S. Pat. Nos. 5,188,441, 5,273,351 and 5,401,088, all issued in the name of the inventor Edward R. Ruble. These patents disclose a three part studded traction assembly that reduces the overall number of parts required and thus is also easier to install than the Reedy patented device and that also address the problem of track deterioration in their own way. However, these patented devices still require a three part studded traction assembly and likewise suffer from the big disadvantage of being cumbersome to install the first time, as well as each time a user desires to change studs to adjust to different "ground" surface conditions or replace a broken stud.

The track deterioration problem addressed by each of the hereinbefore patented devices after the Reedy patented device involves providing a studded traction assembly that prevents track "pull-through". Track "pull-through" results from a studded traction assembly working its way loose in the vehicle track over time and then being torqued back and forth during operation of the vehicle track and the repeated engagement and disengagement of the studded traction assembly with a support or "ground" surface, thereby weakening the area around the installed studded traction assembly and eventually "pulling-through" the track.

The prior art disclosed patents have all tried to provide non-loosening features in their devices to overcome the "pull-through" problem, but none have met with satisfactory success on a consistent basis. Our invention, on the other hand, includes new and improved features that overcome the track "pull-through" problem on a successfully consistent basis, in addition to addressing the other shortcomings of the prior art studded traction assemblies known to the applicants.

These and other types of studded traction assemblies disclosed in the prior art do not offer the flexibility and inventive features of the disclosed and claimed studless traction assembly. As will be described in greater detail hereinafter, the studless traction assembly of the present invention differs from those previously proposed.

SUMMARY OF THE INVENTION

According to our present invention, we have provided a studless traction assembly for a vehicle track, including an externally threaded stud, the vehicle track having an inner surface, an outer surface for contacting a support surface and an aperture extending from the inner surface to the outer surface, the improvement comprising: a T-shaped nut; the T-shaped nut having a first end and a second end; a threaded aperture extending longitudinally through an internal portion of the T-shaped nut between the first and second ends; a threaded surface extending longitudinally along an external portion of the T-shaped nut between the first and second ends; an inner plate at the first end of the T-shaped nut, the inner plate having an undersurface for contacting the inner surface of the vehicle track; an outer washer; the outer washer having a threaded hole extending vertically through a center portion of the outer washer, the threaded hole enabling operable engagement of the outer washer with the threaded surface of the T-shaped nut at the second end of the T-shaped nut; the outer washer and the inner plate adapted to contact a portion of the vehicle track therebetween upon operable engagement of the T-shaped nut and the outer washer with each other and the vehicle track; and, the threaded aperture of the T-shaped nut being retainingly engageable with the externally threaded stud in a removable connected relationship with the T-shaped nut when the T-shaped nut and the outer washer are operable engaged with each other and the vehicle track.

Another feature of our invention relates to the outer washer having a washer diameter larger than a plate diameter of the inner plate.

Still another feature of our invention concerns the outer washer having one or a combination of the following features: a dish-like concave uppersurface; being frustoconical in configuration and having a beveled annular collar extending radially outward from the center portion of the outer washer at a bottom surface of the outer washer; a ring shaped offset annular surface encircling the dish-like concave uppersurface adjacent to the dish-like concave uppersurface; and having at least two spanner holes extending vertically from the dish-like concave uppersurface to a bottom surface of the outer washer and each of the at least two spanner holes being located between the center portion and a washer circumference of the outer washer.

According to important features of our invention we have also provided the T-shaped nut having one or a combination of the following features: a beveled edge encircling an outer circumference of a top surface of the inner plate; the undersurface of the inner plate being knurled; the second end of the T-shaped nut having a counterarea portion adjacent the threaded aperture; a hex key way in a top surface of the inner plate to enable wrench means to be inserted therein for aiding in the installation of the studless traction assembly with the vehicle track; a sloped collar encircling the first end of the T-shaped nut adjacent to the undersurface of the inner plate; and a step shoulder encircling the first end of the T-shaped nut in between the inner plate and the threaded surface extending longitudinally along an external portion of the T-shaped nut between the first and second ends.

Yet another feature of our invention we have provided is all edges of the T-shaped nut and the outer washer being at least broken to provide substantially cornerless edges.

Still another feature of our invention concerns the T-shaped nut and the outer washer have a first threaded relationship opposite that of a second threaded relationship of the T-shaped nut and the stud.

Finally, according to another embodiment our present invention, we have provided a studless traction assembly for a vehicle track, including a stud, the vehicle track having an inner surface, an outer surface for contacting a support surface and an aperture extending from the inner surface to the outer surface, the improvement comprising: a hollowed-out T-shaped nut; the hollowed-out T-shaped nut having a first end and a second end; an inner plate at the first end of the hollowed-out T-shaped nut, the inner plate having an undersurface for contacting the inner surface of the vehicle track; an outer washer; the outer washer having a center portion operably engageable with the second end of the hollowed-out T-shaped nut, the outer washer and the inner plate adapted to contact a portion of the vehicle track therebetween upon operable engagement of the hollowed-out T-shaped nut and the outer washer with each other and the vehicle track; and, the hollowed-out T-shaped nut being retainingly engageable with the stud in a removable connected relationship when the hollowed-out T-shaped nut and the outer washer are operably engaged with each other and the vehicle track.

Other objects, features and advantages of our invention will become more readily apparent upon reference to the following description when taken in conjunction with the accompanying drawings, which drawings illustrate several embodiments of our invention.

DESCRIPTION OF THE DRAWINGS

FIG. 1 is a partial side elevational view of a studless traction assembly in an operating environment, in accordance with the first embodiment of our studless traction assembly;

FIG. 2 is an exploded partial cross-sectional and perspective side view of the studless traction assembly relative to a flexible vehicle track, in accordance with the first embodiment of our studless traction assembly;

FIG. 3 is an exploded partial perspective side view of the studless traction assembly with the studless traction assembly operably engaging a flexible vehicle track, in accordance with the first embodiment of our studless traction assembly;

FIG. 4 is an exploded partial perspective side view of the studless traction assembly with the studless traction assembly operably engaging a flexible vehicle track, including a stud retainingly engaged therewith, in accordance with the first embodiment of our studless traction assembly;

FIG. 5 is a top plan view of a T-shaped nut in accordance with the first embodiment of our studless traction assembly;

FIG. 6 is a side view of the T-shaped nut shown in FIG. 5.;

FIG. 7 is a cross-sectional side view of the T-shaped nut shown in FIG. 5., taken along the line 5—5;

FIG. 8 is a bottom plan view of the T-shaped nut shown in FIG. 5;

FIG. 9 is a top plan view of a T-shaped nut, including a hex key way therein, in accordance with the first embodiment of our studless traction assembly;

FIG. 10 is a cross-sectional side view of the T-shaped nut shown in FIG. 9., taken along the line 9—9;

FIG. 11 is a cross-sectional side view of a T-shaped nut without a threaded surface extending longitudinally along an external portion of the T-shaped nut, in accordance with the second embodiment of our studless traction assembly shown in FIG. 5, taken along the line 5—5;

DETAILED DESCRIPTION OF THE PREFERRED EMBODIMENT

Figure 15:
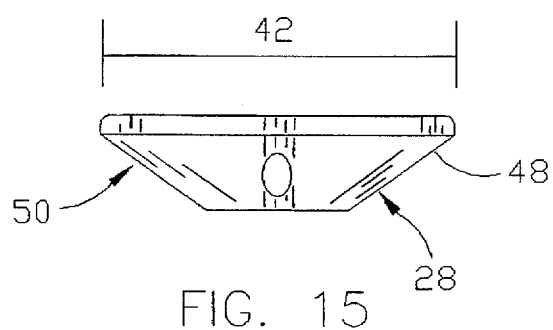

Referring now to the drawings, FIGS. 1 to 4 show our new and improved studless traction assembly 2 for a vehicle track 4, such as a snowmobile including an idler wheel 5. The vehicle track 4 has an inner surface 6, an outer surface 8 for contacting a support surface (such as a ground surface of mud, grass, snow, ice, etc., not specifically shown in the drawings), and a pre-cut aperture 12 extending from the inner surface 6 to the outer surface 8. The studless traction assembly 2 comprises two piece parts including a T-shaped nut or hollowed-out T-shaped nut 14 and an outer washer 28. Excellent results are obtained when the T-shaped nut 14 and an outer washer 28 are constructed of aluminum, although any at least semi-rigid material would be possible, including without limitation, plastics, metals, ceramics, etc. In particular, the preferred aluminum is commonly known in the industry as 7075-T6 because of its superior durability characteristics in a light weight medium, it being understood however, that lower grades of aluminum could be used to save costs at the sacrifice of durability, as desired by the user.

Turning now to FIGS. 5 through 11, the T-shaped nut 14 has a first end 16 and a second end 18. A threaded aperture 20 extends longitudinally through an internal portion 21 of the T-shaped nut between the first end 16 and second end 18. A threaded surface 22 extends longitudinally along an external portion 23 of the T-shaped nut between the first and second ends 16 and 18 respectively. An inner plate 24 is connected to the first end 16 of the T-shaped nut. The inner plate has an undersurface 26 for contacting the inner surface 6 of the vehicle track 4. Although the threaded aperture 20 could extend into and through the inner plate 24 and attain the features of our invention, such not being specifically shown in the drawings, it is preferred that the threaded aperture 20 not extend into and through the inner plate 24 but just up to the inner plate, as shown in the drawings.

Figure 12:
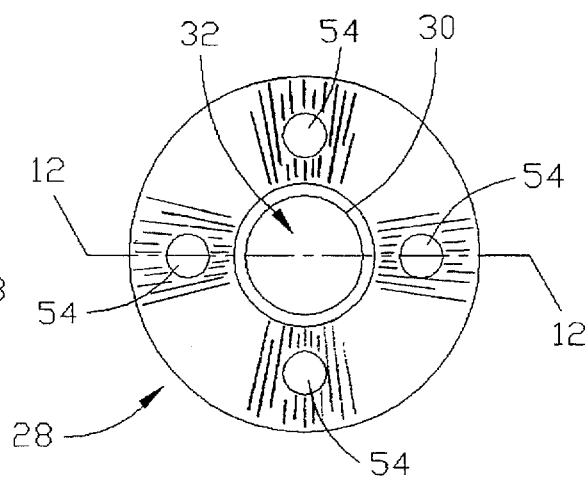
FIG. 12 is a bottom plan view of a outer washer in accordance with the first embodiment of the studless traction assembly.
Figure 14:
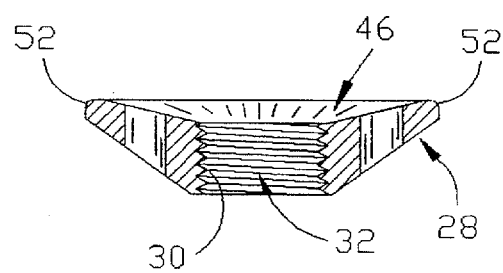
FIG. 14 is a cross-sectional side view of the outer washer shown in FIG. 12; taken along the line 12—12, and, FIG. 15 is a perspective side view of the outer washer shown in FIG. 12.
Figure 13:
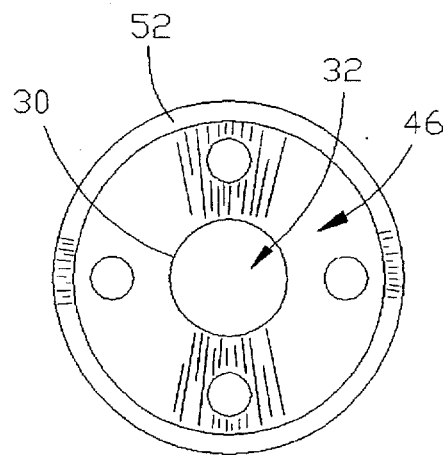
FIG. 13 is a top plan view of the outer washer shown in FIG. 12.

Referring to FIGS. 12 through 15, the outer washer 28 has a threaded hole 30 extending vertically through a center portion 32 of the outer washer. The threaded hole 30 enables operable engagement of the outer washer 28 with the threaded surface 22 of the T-shaped nut at the second end 18 of the T-shaped nut. The outer washer and the inner plate are adapted to contact a portion 34 of the vehicle track therebetween upon operable engagement of the T-shaped nut and the outer washer with each other and the vehicle track, as shown in FIGS. 3 and 4.

In the first embodiment of our invention disclosed and claimed herein, the studless traction assembly is semi-permanently assembleable in the vehicle track. To this end, the threaded hole 30 enables operable engagement of the outer washer 28 with the threaded surface 22 of the T-shaped nut at the second end 18 of the T-shaped nut. Referring now to FIG. 2, to assemble our studless traction assembly the T-shaped nut 14 is pushed through the pre-cut aperture 12. Then, the outer washer 28 is screwed onto the threaded surface 22 of the T-shaped nut at the second end 18 of the T-shaped nut. The outer washer and the inner plate are then tightened to a preferred 10 foot-pounds of torque.

One significant advantage of the first embodiment of our studless traction assembly is that the tightening process can be performed from just one side of the track, namely the outer surface side of the track. In most prior art traction assemblies one has to have clear access to the inner surface of the track for one's hands, as well as a significant amount of access for operating tightening tools on the inner surface of the vehicle track to prevent the prior art T-nuts from spinning in the aperture during operable engagement of a prior art stud with T- nut to attain a tight secure relationship between the T- nut and the stud when they are engaged with the vehicle track. In our device, a spanner-style socket (which can be purchased under the name "Spanner Socket" from Innovative Solutions International, Inc. of Carol Stream, Ill.) is adapted to engage a bottom surface 50 of the outer washer and at least one spanner hole 54 located adjacent the bottom surface, and thereby provide rotational means to tighten the T-shaped nut 14 together with the outer washer 28.

Further, after the T-shaped nut is pushed through the aperture another significant advantage is noted in the assembly of the first embodiment of our studless traction assembly that does not exist in the prior art. In particular, the threaded surface 22 of the T-shaped nut enables the T-shaped nut to be threadingly operably engaged into a tight secure relationship with the outer washer without requiring an installer to put much, if any, force on the inner surface 6 of the track, and namely the inner plate 24, once the T-shaped nut is pushed through the aperture in the vehicle track.

In a second embodiment of our studless traction assembly disclosed and claimed herein, the studless traction assembly is permanently assembleable in the vehicle track. To this end, as shown in FIG. 11, the T-shaped nut 14 does not have the threaded surface 22 extending longitudinally along the external portion 23 of the T-shaped nut between the first and second ends 16 and 18 respectively. Simultaneously, the outer washer 28 would not have the threaded hole 30 extending vertically through a center portion 32 of the outer washer, but rather, would just have a cut out center portion 32 operably engageable with the T-shaped nut 14. In this embodiment, after the T-shaped nut 14 is pushed through the pre-cut aperture 12 then the outer washer 28 is permanently secured to the second end 18 of the T-shaped nut or hollowed-out T-shaped nut in a friction fitted relationship. Any adequate means such as welding, bonding, riveting or the like may be used to secure together the outer washer and the T-shaped nut in operable engageable with each other and the vehicle track.

Now, with either embodiment in the assembled position, the undersurface 26 of the inner plate 24 connected to the T-shaped nut contacts the inner surface 6 of the vehicle track. Simultaneously, a dish-like concave uppersurface 46 including a ring shaped offset annular surface 52 contacts the outer surface 8 of the vehicle track and thereby the T-shaped nut and the outer washer pressingly contact a portion 34 of the vehicle track therebetween, as shown in FIGS. 3 and 4.

When utilizing our studless traction assembly in an operating environment, under either the first and second embodiment of our invention, most often a user will include a stud 36 having an externally threaded end 38 and a support surface engaging end 40. Excellent results are obtained when the stud used in combination with our studless traction assembly is a ¼-20 UNC carbide tipped steel stud, like that sold by Innovative Solutions International, Inc. of Carol Stream, Ill. under the tradename "Tornado". It is understood however, that any appropriately threaded stud could be combined with our assembly 2 and still obtain the advantages of our invention, and in fact this interchangeability of studs is a significant feature of our invention.

To achieve the operable engagement of the stud 36 with the studless traction assembly 2, the threaded aperture 20 of the T-shaped nut is retainingly engageable with the externally threaded end 38 of the stud in a removable connected relationship with the T-shaped nut when the T-shaped nut 14 and the outer washer 28 are operably engaged with each other and the vehicle track 4, as shown in FIGS. 1, 3 and 4. This is not to say that the stud 36 can be retainingly engaged with the T-shaped nut only when the T-shaped nut and the outer washer are operable engaged with each other and the vehicle track 4, because, the stud 36 can be retainingly engaged with the T-shaped nut when the T-shaped nut and the outer washer are not operable engaged with each other or with the vehicle track, as desired.

Although a stud is most often used with our studless traction assembly, it should be understood that our assembly 2 does not require the use of a stud for installation or use of our assembly 2 with a vehicle track. In this way our assembly 2 allows a user the flexibility to operate their track driven vehicle without studs to prevent damage to trailer beds, concrete floors, driveways, etc., as well as the studs themselves. Moreover, the semi-permanent or permanent embodiments of our assembly 2 provide a fast and easy way to change studs to adjust to support surface or ground conditions. Once the T-shaped nut and the outer washer are assembled together with the vehicle track a user will never have to place their hands or tools into the vehicle suspension to change, remove or install studs.

Another advantage achieved by our studless traction assembly being studless, is that of a lighter overall weighted assembly because the T-shaped nut and the washer comprise an aluminum material providing a total material composition of lighter weight that conventional push through stud assemblies. Our studless traction assembly 2 is constructed of light weight aluminum material having a durability and strength sufficient to maintain the assembly 2 in the assembled position in the track once installed therein. Then, our assembly 2 can be combined with any variety if studs constructed of heavier weight steel having sufficient tensile strength to endure even the rigors of ice-shearing. The result is a studded traction assembly being of an overall less weighty material composition than exists in the prior art. Thus, our traction assembly as shown in FIG. 4 combines the best of both words producing a lighter weight traction assembly having enhanced durability and strength characteristics over that existing in prior art devices.

Another weight, and also a cost, reducing feature inherent in our invention is that the same over all length, when measured from the inner plate 24 of the T-shaped nut 14 to an outermost point of support surface engaging end 40, can be achieved with a shorter stud. As noted in FIG. 4 as well as others, the stud 36 does not extend completely into and through the first end 16 of the T-shaped nut but is set away from a top surface 60 of the inner plate 24.

A further advantage to having the stud set away from the top surface of the inner plate is that the studless traction assembly when combined with a stud has a pivot point at a location above the outer washer. In this way, perpendicular torquing of the assembly 2 relative to the vehicle track is minimized during operation of the vehicle track in an operational environment. In particular, the torque forces are more effectively spread out by the outer washer over the outer surface of the vehicle track and they are not so influential to the inner plate of the T-shaped nut which is in contact with the inner surface of the vehicle track. Therefore, our studless traction assembly once installed in a vehicle track is less affected by torque forces in an operating environment and thus less likely to work its way loose in the vehicle track over time, thereby, reducing the likelihood of track "pull-through".

All these weight considerations when translated in light of a vehicle track having our studless traction assembly 2 (our assembly 2 being up to 50% lighter than some prior art traction assemblies), result in a track having overall less weight than would be necessary with prior art devices. This in turn results in the vehicle having to expend less energy to attain the same track drive speed as that of a more weighty track. Moreover, since the track is in motion, the energy requirement of the vehicle are even less encumbered, applying the same moving mass physics principles discussed in the "Description of the Prior Art" section of this application hereabove.

Other features discussed hereafter are not required to practice the essence of our invention embodied in our studless traction assembly, but such features enhance the existing advantages inherent in our assembly and provide a studless traction assembly producing further excellent results in an operational environment.

Our studless traction assembly can be coated to create different colored outer surfaces, providing decorative as well as functional advantages. Functionally, anodization imparts some surface hardening which enhances the durability of the assembly 2, produces a corrosive resistant outer surface and eliminates galvanic reaction with dissimilar metals.

Our assembly 2 can be constructed where the outer washer 28 has a washer diameter 42 at least as large as a plate diameter 44 of the inner plate 24 and preferrably larger than the plate diameter 44. In this way, the inner plate can be drawn into the vehicle track to provide a smoother running surface when the vehicle track passes over the idler wheel 5 in operation, increasing the life of the idler wheel as well as the studless traction assembly. Also, drawing the inner plate into the vehicle track provides enhanced holding power when the assembly 2 is assembled in the vehicle track. Excellent results are obtained when the washer diameter 42 is between 1 inch and 1.5 inches, and preferably 1.125 inches. Likewise, depending on the washer diameter, excellent results are obtained when the plate diameter 44 is between 0.75 inch and 1.125 inches, and preferably 0.875 inch.

Further to the end of providing a smoother running surface when the vehicle track passes over the idler wheel 5 in operation, we have provided a beveled edge 58 encircling an outer circumference of a top surface 60 of the inner plate. Excellent results are obtained when the angle of the beveled edge 58 is between 5° and 25° and preferably 15°.

Further towards the end of preventing track "pull-through", our studless traction assembly can be provided with all edges of the T-shaped nut and the outer washer being at least broken to provide substantially cornerless edges. Moreover, excellent results are obtained when an outer edge of the ring shaped offset annular surface 52 said outer edge also being adjacent the washer circumference and an outer circumferential edge adjacent the beveled edge 58 of the inner plate are more than broken and in fact rounded. Being rounded further aids in providing a smoother running surface when the vehicle track passes over the idler wheel 5 in operation, increasing the life of the idler wheel by reducing friction therewith as well as increasing the life of the studless traction assembly.

Further towards the end of providing enhanced holding power when the assembly 2 is assembled in the vehicle track, our assembly 2 can include the undersurface 26 of the inner plate 24 having a knurled or raised portion 62. The knurling 62 reduces the likelihood of the assembly 2 spinning in the aperture 12 once assembled in the vehicle track and over the life of the assembly when studs are regularly put into and taken out of the assembly 2, as desired.

Another feature of our assembly can include the outer washer 28 having the dishlike concave upper surface 46. This upper surface 46 could be a continuous curved surface or a segmented curved surface, as desired. This upper surface 46 serves two purposes. First, it helps to distribute the torque forces, that the assembly encounters when in operation, over a larger surface area across the dish-like concave upper surface as well as at the ring shaped offset annular surface 52 encircling the upper surface 46, both surfaces being in contact with the outer surface 8 when the assembly 2 is in the assembled position. Second, upper surface 46 provides enhanced holding power when the assembly 2 is assembled in the vehicle track by drawing the track material 34 into a cavity created by the dish-like concave upper surface 46 when assembled in the assembled position with the T-shaped nut in the track.

Further to the end of providing enhanced holding power when the assembly 2 is assembled in the vehicle track our studless traction assembly 2 could include the outer washer being frusto-conical in configuration having a beveled annular collar 48 extending radially outward from the center portion 32 of the outer washer at a bottom surface 50 of the outer washer. Excellent results are obtained when the angle of the beveled annular collar 48 is between 30° and 45° and preferably 35°.

Still further to the end of providing enhanced holding power when the assembly 2 is assembled in the vehicle track our studless traction assembly 2 could include a sloped collar 70 encircling the first end 16 of the T-shaped nut adjacent to the undersurface 26 of the inner plate 24. The sloped collar 70 creates an angled engagement of the sloped collar 70 with the aperture 12 adjacent to the inner surface 6 of the vehicle track thereby providing increased surface area contact between the T-shaped nut and the aperture 12 and enabling enhanced holding power when the assembly 2 is assembled in the vehicle track.

Again further to the end of providing enhanced holding power when the assembly 2 is assembled in the vehicle track, in the first embodiment of our studless traction assembly 2, it could include the T-shaped nut and the outer washer have a first threaded relationship opposite that of a second threaded relationship of the T-shaped nut and the stud. For example, excellent results are obtained when the T-shaped nut and the outer washer have a left-hand threaded relationship which is opposite a right-hand threaded relationship of the T-shaped nut and the stud. The opposite threaded relationship better insures that when the studs are being screwed into and unscrewed from the T-shaped nut, the T-shaped nut and the outer washer will less likely become unintentionally loosened or disengaged from each other because their threaded relationship is opposite that of the studs with the T-shaped nut. Thus, tightening of the studs will cause the T-shaped nut and the washer to tend towards rotation further engaging the T-shaped nut and outer washer.

To aid in the quick and accurate installation and removal of studs 36 from our assembled studless traction assembly 2, our assembly may include the second end of the T-shaped nut having a counterarea portion 64 adjacent the threaded aperture. This counterarea portion 64 may be more pronounced to be a so-called "counterbore" or it may be less pronounced and similar to a so called "countersink". To aid in installation of interchangeability of the studs, it is preferred to have a counterarea portion 64 more akin to a "counterbore", as shown in the drawings.

As a further aid in the quick and accurate installation and removal of studs 36 from our assembled studless traction assembly 2, our assembly may include the studs 36 having a cross-section hexagonal shaped middle portion 80 located between the externally threaded end 38 and the support surface engaging end 40. The cross-section hexagonal shaped middle portion thereby enables the stud to be inserted into and removed from the T-shaped nut by a manually, mechanically or electrically operated socket wrench, wrench or other comparable nut or bolt engageable securing device. Excellent results are obtained when the stud is adapted to receive ⅜ inch power socket drive means.

Aiding in the assembly of our studless traction assembly itself with a vehicle track, the assembly 2 may include a step shoulder 72 encircling the first end 16 of the T-shaped nut in between the inner plate and the threaded surface and extending longitudinally along an external portion of the T-shaped nut between the first and second ends. The step shoulder 72 acts a detent to engage the dish-like concave uppersurface 46 adjacent the center portion 32 of the outer washer, thereby preventing a user from over squashing the portion 34 of the vehicle track located between the T-shaped nut and the outer washer when in operable engagement with each other and the vehicle track. Also, the step shoulder 72 provides increased strength to the first end of the T-shaped nut itself. Additionally, the step shoulder reduces the likelihood of track "pull-through" when it is sized for a snug fitted relationship with the aperture 12 thereby providing continuous step shoulder surface to aperture surface engagement.

Further as an aid in the installation and removal of our studless traction assembly itself, our assembly 2 may include a hex key way 66 in a top surface of the inner plate to enable wrench means to be inserted therein for aiding in the installation, removal and changing of the studless traction assembly with the vehicle track. Excellent results are obtained when the size of the hex key way is 5/32 of an inch.

Yet further to the end of aiding in the installation and removal of our studless traction assembly itself, our studless traction assembly 2 could include the outer washer having at least one spanner hole 54 extending vertically from the dish-like concave uppersurface 46 to the bottom surface 50 of the outer washer. The spanner hole is located between the center portion 34 and a washer circumference 56 of the outer washer. Additionally, the spanner holes assist a user in the installation of our studless traction assembly 2 with a vehicle track. Excellent results are obtain when three or four spanner holes are utilized but satisfactory results are still obtained when one to six spanner holes are utilized.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

We claim:

1. A studless traction assembly for a vehicle track, such as a snowmobile, the vehicle track having an inner surface, an outer surface for contacting a support surface and an aperture extending from the inner surface to the outer surface, the studless traction assembly comprising:

a T-shaped nut;

the T-shaped nut having a first end and a second end;

a threaded aperture extending longitudinally through an internal portion of the T-shaped nut between the first and second ends;

a threaded surface extending longitudinally along an external portion of the T-shaped nut between the first and second ends;

an inner plate at the first end of the T-shaped nut, the inner plate having an undersurface for contacting the inner surface of the vehicle track;

an outer washer;

the outer washer having a threaded hole extending vertically through a center portion of the outer washer, the threaded hole enabling operable engagement of the outer washer with the threaded surface of the T-shaped nut at the second end of the T-shaped nut;

the outer washer and the inner plate adapted to contact a portion of the vehicle track therebetween upon operable engagement of the T-shaped nut and the outer washer with each other and the vehicle track;

a stud;

the stud having an externally threaded end and a support surface engaging end; and, the threaded aperture of the T-shaped nut being retainingly engageable with the externally threaded end of the stud in a removable connected relationship with the T-shaped nut when the T-shaped nut and the outer washer are operably engaged with each other and the vehicle track.

2. The studless traction assembly of claim 1, wherein the outer washer has a washer diameter at least as large as a plate diameter of the inner plate.

3. The studless traction assembly of claim 1, wherein the outer washer has a dish-like concave upper surface.

4. The studless traction assembly of claim 1, wherein the outer washer is frusto-conical in configuration having a beveled annular collar extending radially outward from the center portion of the outer washer at a bottom surface of the outer washer.

5. The studless traction assembly of claim 3, wherein a ring shaped offset annular surface encircles the dish-like concave upper surface adjacent to the dish-like concave upper surface.

6. The studless traction assembly of claim 3, wherein the outer washer is frusto-conical in configuration having a beveled annular collar extending radially outward from the center portion of the outer washer at a bottom surface of the outer washer.

7. The studless traction assembly of claim 3, wherein the outer washer has at least one spanner hole extending vertically from the dish-like concave upper surface to a bottom surface of the outer washer and the spanner hole being located between the center portion and a washer circumference of the outer washer.

8. The studless traction assembly of claim 6, wherein the outer washer has at least one spanner hole extending vertically from the dish-like concave upper surface to the beveled annular collar and the spanner hole being located between the center portion and a washer circumference of the outer washer.

9. The studless traction assembly of claim 1, wherein a beveled edge encircles an outer circumference of a top surface of the inner plate.

10. The studless traction assembly of claim 1, wherein the undersurface of the inner plate is knurled.

11. The studless traction assembly of claim 1, wherein the second end of the T-shaped nut has a counterarea portion adjacent the threaded aperture.

12. The studless traction assembly of claim 1, wherein there is a hex key way in a top surface of the inner plate to enable wrench means to be inserted therein for aiding in the installation and removal of the studless traction assembly with the vehicle track.

13. The studless traction assembly of claim 1, wherein a sloped collar encircles the first end of the T-shaped nut adjacent to the undersurface of the inner plate.

14. The studless traction assembly of claim 1, wherein a step shoulder encircles the first end of the T-shaped nut in between the inner plate and the threaded surface extending longitudinally along an external portion of the T-shaped nut between the first and second ends.

15. The studless traction assembly of claim 1, wherein all edges of the T-shaped nut and the outer washer are at least broken to provide substantially cornerless edges.

16. The studless traction assembly of claim 1, wherein the T-shaped nut and the outer washer have a first threaded relationship opposite that of a second threaded relationship of the T-shaped nut and the stud.

17. The studless traction assembly of claim 1, wherein the stud has a cross-section hexagonal shaped middle portion located between the externally threaded end and the support surface engaging end, the cross-section hexagonal shaped middle portion enabling the stud to be inserted into and removed from the T-shaped nut by socket drive means.

18. In a studless traction assembly for a vehicle track, including an externally threaded stud, the vehicle track having an inner surface, an outer surface for contacting a support surface and an aperture extending from the inner surface to the outer surface, the improvement comprising:

a T-shaped nut;

the T-shaped nut having a first end and a second end;

a threaded aperture extending longitudinally through an internal portion of the T-shaped nut between the first and second ends;

a threaded surface extending longitudinally along an external portion of the T-shaped nut between the first and second ends;

an inner plate at the first end of the T-shaped nut, the inner plate having an undersurface for contacting the inner surface of the vehicle track;

an outer washer;

the outer washer having a threaded hole extending vertically through a center portion of the outer washer, the threaded hole enabling operable engagement of the outer washer with the threaded surface of the T-shaped nut at the second end of the T-shaped nut;

the outer washer and the inner plate adapted to contact a portion of the vehicle track therebetween upon operable engagement of the T-shaped nut and the outer washer with each other and the vehicle track; and, the threaded aperture of the T-shaped nut being retainingly engageable with the externally threaded stud in a removable connected relationship with the T-shaped nut when the T-shaped nut and the outer washer are operably engaged with each other and the vehicle track.

19. The studless traction assembly of claim 18, wherein the outer washer has a washer diameter at least as large as a plate diameter of the inner plate.

20. The studless traction assembly of claim 18, wherein the outer washer has a dish-like concave upper surface.

21. The studless traction assembly of claim 18, wherein the outer washer is frusto-conical in configuration having a beveled annular collar extending radially outward from the center portion of the outer washer at a bottom surface of the outer washer.

22. The studless traction assembly of claim 20, wherein a ring shaped offset annular surface encircles the dish-like concave upper surface adjacent to the dish-like concave upper surface.

23. The studless traction assembly of claim 20, wherein the outer washer is frusto-conical in configuration having a beveled annular collar extending radially outward from the center portion of the outer washer at a bottom surface of the outer washer.

24. The studless traction assembly of claim 20, wherein the outer washer has at least one spanner hole extending vertically from the dish-like concave upper surface to a bottom surface of the outer washer and the spanner hole being located between the center portion and a washer circumference of the outer washer.

25. The studless traction assembly of claim 23, wherein the outer washer has at least one spanner hole extending vertically from the dish-like concave upper surface to the beveled annular collar and the spanner hole being located between the center portion and a washer circumference of the outer washer.

26. The studless traction assembly of claim 18, wherein a beveled edge encircles an outer circumference of a top surface of the inner plate.

27. The studless traction assembly of claim 18, wherein the undersurface of the inner plate is knurled.

28. The studless traction assembly of claim 18, wherein the second end of the T-shaped nut has a counterarea portion adjacent the threaded aperture.

29. The studless traction assembly of claim 18, wherein there is a hex key way in a top surface of the inner plate to enable wrench means to be inserted therein for aiding in the installation and removal of the studless traction assembly with the vehicle track.

30. The studless traction assembly of claim 18, wherein a sloped collar encircles the first end of the T-shaped nut adjacent to the undersurface of the inner plate.

31. The studless traction assembly of claim 18, wherein a step shoulder encircles the first end of the T-shaped nut in between the inner plate and the threaded surface extending longitudinally along an external portion of the T-shaped nut between the first and second ends.

32. The studless traction assembly of claim 18, wherein all edges of the T-shaped nut and the outer washer are at least broken to provide substantially cornerless edges.

33. The studless traction assembly of claim 18, wherein the T-shaped nut and the outer washer have a first threaded relationship opposite that of a second threaded relationship of the T-shaped nut and the stud.

34. In a studless traction assembly for a vehicle track, including a stud, the vehicle track having an inner surface, an outer surface for contacting a support surface and an aperture extending from the inner surface to the outer surface, the improvement comprising:

a hollowed-out T-shaped nut;

the hollowed-out T-shaped nut having a first end and a second end;

an inner plate at the first end of the hollowed-out T-shaped nut, the inner plate having an undersurface for contacting the inner surface of the vehicle track;

an outer washer;

the outer washer having a center portion operably engageable with the second end of the hollowed-out T-shaped nut, the outer washer and the inner plate adapted to contact a portion of the vehicle track therebetween upon operable engagement of the hollowed-out T-shaped nut and the outer washer with each other and the vehicle track; and, the hollowed-out T-shaped nut being retainingly engageable with the stud in a removable connected relationship when the hollowed-out T-shaped nut and the outer washer are operably engaged with each other and the vehicle track.

35. The studless traction assembly of claim 34, wherein the outer washer has a washer diameter at least as large as a plate diameter of the inner plate.

36. The studless traction assembly of claim 34, wherein the outer washer is frusto-conical in configuration having a dish-like concave upper surface and the outer washer has a beveled annular collar extending radially outward from the center portion of the outer washer at a bottom surface of the outer washer.

37. The studless traction assembly of claim 34, wherein a beveled edge encircles an outer circumference of a top surface of the inner plate, the undersurface of the inner plate is knurled, a sloped collar encircles the first end of the T-shaped nut adjacent to the undersurface of the inner plate, and a step shoulder encircles the first end of the T-shaped nut in between the inner plate and the threaded surface extending longitudinally along an external portion of the T-shaped nut between the first and second ends.

* * * * *